United States Patent
Ragusa et al.

(10) Patent No.: US 10,742,615 B2
(45) Date of Patent: Aug. 11, 2020

(54) PARTIAL ENCRYPTION OF A STATIC WEBPAGE

(71) Applicant: International Business Machines Corporation, Armonk, NY (US)

(72) Inventors: Roberto Ragusa, Rome (IT); Marco Gianfico, Sant'Antimo (IT); Giulia Carnevale, Rome (IT); Ciro Ragusa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 15/927,493

(22) Filed: Mar. 21, 2018

(65) Prior Publication Data
US 2019/0297058 A1 Sep. 26, 2019

(51) Int. Cl.
*H04L 29/06* (2006.01)
*G06F 21/62* (2013.01)
*H04L 9/08* (2006.01)
*H04L 9/06* (2006.01)

(52) U.S. Cl.
CPC ...... *H04L 63/0428* (2013.01); *G06F 21/6245* (2013.01); *H04L 9/0819* (2013.01); *H04L 9/0625* (2013.01); *H04L 9/0631* (2013.01)

(58) Field of Classification Search
CPC .. H04L 63/0428; H04L 9/0625; H04L 9/0819
See application file for complete search history.

(56) References Cited

U.S. PATENT DOCUMENTS

| | | | |
|---|---|---|---|
| 7,003,800 B1 * | 2/2006 | Bain | G06F 21/6209 713/183 |
| 8,806,187 B1 * | 8/2014 | Vemula | H04L 67/34 713/150 |
| 9,571,471 B1 | 2/2017 | Kupreev et al. | |
| 9,690,763 B1 * | 6/2017 | Lee | G06F 16/954 |
| 2003/0159030 A1 | 8/2003 | Evans | |
| 2004/0059945 A1 | 3/2004 | Henson et al. | |
| 2009/0144546 A1 * | 6/2009 | Jancula | H04L 63/0428 713/168 |
| 2009/0254994 A1 * | 10/2009 | Waterson | G06F 21/83 726/26 |
| 2010/0014662 A1 * | 1/2010 | Jutila | H04L 9/083 380/44 |
| 2010/0023751 A1 * | 1/2010 | He | H04L 63/0428 713/150 |

(Continued)

OTHER PUBLICATIONS

He, et al., "ShadowCrypt: Encrypted Web Applications for Everyone", CCS'14, Nov. 3-7, 2014, Scottsdale, Arizona, USA., Copyright 2014 ACM, 12 pages.

*Primary Examiner* — Ali Shayanfar
(74) *Attorney, Agent, or Firm* — Robert J. Shatto

(57) ABSTRACT

Construction of the static webpage begins. A first portion of content of the static webpage to encrypt is identified, the first portion being less than the entire static webpage. The first portion of content of the static webpage is encrypted. A first decryption key is provided to a first group of user devices, wherein the first decryption key allows each user device in the first group of user devices to decrypt the first encrypted portion of content of the static webpage. The static webpage is provided to a server, wherein the server allows public access to the static webpage.

14 Claims, 5 Drawing Sheets

(56) References Cited

U.S. PATENT DOCUMENTS

| | | | |
|---|---|---|---|
| 2012/0204242 A1* | 8/2012 | Cohen | G06F 21/305 |
| | | | 726/5 |
| 2013/0067225 A1 | 3/2013 | Shochet et al. | |
| 2013/0086643 A1* | 4/2013 | Morgan | G06F 21/125 |
| | | | 726/4 |
| 2013/0091356 A1* | 4/2013 | Ail | G06F 16/958 |
| | | | 713/168 |
| 2013/0232339 A1* | 9/2013 | Ignatchenko | H04N 21/2347 |
| | | | 713/171 |
| 2014/0068789 A1* | 3/2014 | Watts | H04L 65/602 |
| | | | 726/29 |
| 2014/0281535 A1* | 9/2014 | Kane | H04L 63/0428 |
| | | | 713/168 |
| 2014/0365564 A1* | 12/2014 | Krishnamurthy | G06Q 30/02 |
| | | | 709/203 |
| 2015/0244700 A1* | 8/2015 | Yasaki | H04L 67/06 |
| | | | 714/15 |
| 2015/0264020 A1* | 9/2015 | Ackerly | H04L 63/0428 |
| | | | 713/168 |
| 2016/0077824 A1* | 3/2016 | Vishnepolsky | H04L 67/1002 |
| | | | 717/172 |
| 2016/0344707 A1* | 11/2016 | Philipp | H04L 67/1097 |
| 2017/0171168 A1* | 6/2017 | Reshadi | H04L 63/0428 |
| 2017/0243243 A1* | 8/2017 | Kosai | G06Q 10/067 |

* cited by examiner

PARTIAL ENCRYPTION OF A STATIC WEBPAGE

BACKGROUND

The present disclosure generally relates to webpage encryption, and more specifically, to partial encryption of webpages. Webpages sometimes contain information directed to the public in general (e.g., world news), sometimes contain information directed to a specific user (e.g., banking information), and sometimes contain both information directed to the public in general and to a specific user (e.g., a company directory which contains generally available information and additionally information only accessible to certain employees or managers). Generally, when a webpage is tailored to a specific user, a custom, dynamic webpage with content for the specific user is generated. This can occur using various forms of user identification.

SUMMARY

Disclosed herein are embodiments of a method, system, and computer program product for secure transmission of a static webpage including encrypted content. Construction of the static webpage begins. A first portion of content of the static webpage to encrypt is identified, the first portion being less than the entire static webpage. The first portion of content of the static webpage is encrypted. A first decryption key is provided to a first group of user devices, wherein the first decryption key allows each user device in the first group of user devices to decrypt the first encrypted portion of content of the static webpage. The static webpage is provided to a server, wherein the server allows public access to the static webpage.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
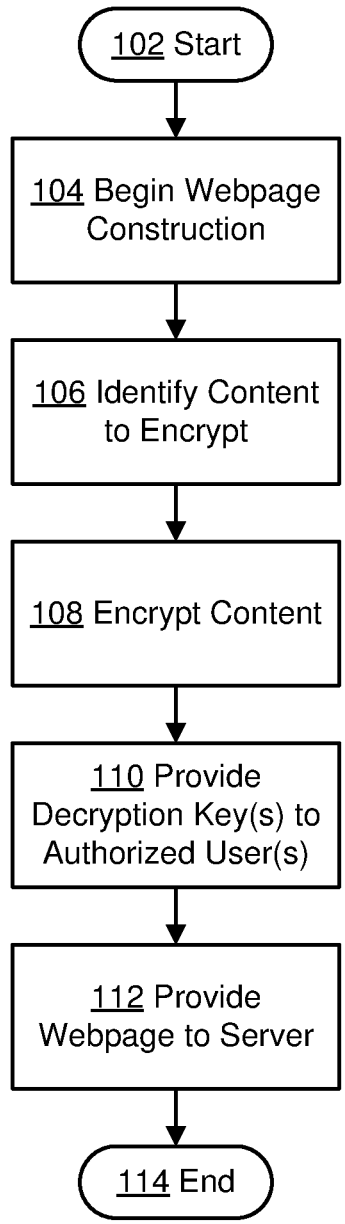
FIG. 1 depicts an example method for secure transmission of a static webpage including encrypted content, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate generally to webpage encryption, and more specifically, to partial encryption of static webpages which may be made generally available without compromising private data. While the present disclosure is not necessarily limited to such applications, various aspects of the disclosure can be appreciated through a discussion of various examples using this context.

Generally, when a webpage is tailored to a specific user, a custom, dynamic webpage with content for the specific user is generated. This can occur using various forms of user identification, such as identification based upon a property of the request (e.g., the IP address of the requesting device) or an explicit user identification (e.g., a user login using a username and password). Upon identification of the user requesting the content, the dynamic webpage can be generated with appropriate content. However, such an approach requires the use of dynamic webpages, which must be generated at runtime and cannot be cached, and often involves a limited browsing session. Such a browsing session can involve undesirable side effects such as automated logouts due to inactivity, requirements to login again upon browser or computer restarts, lock-outs due to incorrect password entry, etc. Additionally, such an approach requires the user to disclose identifying information, whether that be their IP address, their username, or other means of identification. Users who wish to remain anonymous and/or prefer their actions not be logged, cannot effectively use such a system.

Embodiments of the present disclosure include targeted encryption to protect private content in a generally available static webpage. To do this, the creator of the webpage encrypts the private content in the webpage, provides a decryption key to authorized users, and makes the webpage available to the public. Any person with access to the web server hosting the webpage or who can otherwise obtain a copy of the webpage (which may encompass anyone with internet access) can view the unencrypted portion of the webpage. Authorized users can additionally use the decryption key, which may be used automatically by their internet browser, to view some or all of the encrypted information on the webpage. This allows a single version of the webpage to exist in a static form and be generally available, while controlling access to private data contained within the webpage.

Because the same webpage can be retrieved and accessed by anyone without disclosing identifying information, users can remain anonymous, the webpage can be cached, the webpage does not need to be dynamically generated each time it is accessed, and limited browsing sessions can be avoided. These improvements and/or advantages are a non-exhaustive list of example advantages. Embodiments of the present disclosure exist which can contain other advantages or some or all of the aforementioned advantages and/or improvements.

Referring now to FIG. 1, depicted is an example method 100 for secure transmission of a static webpage including encrypted content, in accordance with embodiments of the present disclosure. Method 100 can include more or less actions than those depicted. Method 100 can include actions in different orders than those depicted. Method 100 can be performed using a developer device (such as developer device 400 depicted in FIG. 4).

From start 102, a developer device receives user input from a developer to begin webpage construction at 104. The user input from the developer can use various forms of webpage construction known to those skilled in the art. This can include webpage written using Hypertext Markup Language (HTML) and may include a myriad of elements and types of content, which are beyond the scope of this disclosure. The developer may use a software program or use other assistance in constructing the user input, including a program tailored to assist in the performance of method 100.

At 106, user input is received that identifies content within the webpage to encrypt. Within the webpage being constructed, aspects of the webpage can be identified that should not be generally accessible to the public but should be encrypted such that only certain users can access the information. Examples of such information include personally identifiable information, private addresses and phone numbers, banking information, student test scores, employment data, health records, private photographs or videos, or any other information which the developer determines should not be made public. This identified content can be determined to be encrypted together or separately in smaller portions. For example, if the webpage contains a list or table of usernames and passwords, which should only be accessible by relevant information technology (IT) professionals, the content can be encrypted together such that one decryption key can decrypt all of the information at once. This decryption key can be provided to one or more such IT professionals as discussed below regarding operation 110. Continuing this example, if instead it is determined that each user should be able to access a line of the list or row of a table which contains that user's username and password, each such line or row can be individually encrypted such that decryption keys for each line or row can be created and distributed accordingly. Such decryption keys can be provided to appropriate users as discussed below regarding operation 110. If so desired, all decryption keys could be provided to the IT professionals as above, such that they remain able to access all of the encrypted information.

At 108, the developer device encrypts the identified content. Various methods of encryption can be used in accordance with this disclosure and method 100 should not be read as limited to a particular form or method of encryption. Examples of algorithms which can be used to encrypt data include Data Encryption Standard (DES), triple DES, Rivest-Shamir-Adleman, Blowfish, Twofish, and Advanced Encryption Standard (AES). This list should not be read as limiting and many additional encryption algorithms may be used consistent with this disclosure. The developer device may use a program or enlist some other assistance or user input in performing the encryption of the identified content.

The developer device can additionally include HTML tags (or other such markings) denoting encrypted content (such as <encrypted> and </encrypted>), inside which the encrypted content can be placed. The encrypted content can be placed within these tags in a format which does not cause parsing problems, such as encoding encrypted data using base64 strings. Multiple encrypted sections are possible in a single page, and each of them could have been encrypted with the same or different encryption keys. These <encrypted> HTML tags can inject a subtree of elements into the document object model (DOM) of a web browser for the webpage. When the encrypted content is decrypted, it can be replaced with a <decrypted> or similar tag. Both the <encrypted> and <decrypted> tags can be associated with cascading style sheet (CSS) rules to conveniently style inaccessible content (e.g., encrypted content can be omitted or truncated) and decrypted content (e.g., this content can be highlighted or underlined to emphasize the decrypted content). An example of an HTML code for a webpage with such encryption and HTML encrypted tags is as follows:

<h1>Access to company secrets</h1>
<p>The secret documents are stored on our repository at IP address 192.168.1.1; to get authorization to that system please contact <security@example.com>.</p>
<p>The following user accounts are currently active:</p>
<table>
<th>Username</th><th>Pas sword</th>
<td>John Smith</td><td><encrypted>9018ac3418ead96d405e8c2e842f3d7b</encrypted></td>
<td>Sally White</td><td>
<encrypted>b60c0380e7ac56b689e6f7dbed838544</encrypted></td>
<td>Bill Tucson</td><td><encrypted>c494277674a843de7827cc4adb5c8b3b</encrypted></td>
</table>

In this example HTML code for a webpage, anyone with access to the webpage and without the decryption key or keys will be able to view the content contained in the above code. Without such decryption key(s), instead of viewing the passwords associated with John Smith, Sally White, and Bill Tucson, the web browser used can display the encrypted information without modification (in this case an unintelligible 32-character string) or in some embodiments can be presented with a message indicating "encrypted data," "inaccessible private data," or other such indication that they are unable to view content. In some embodiments, a web browser may prompt a user to input one or more decryption keys or otherwise allow a user to input such keys. In some embodiments, a user can provide one or more decryption keys to their web browser in advance, which may be stored in a repository similar to how many web browsers store user passwords, webpage cookies, or other information used to automate a user's web browsing experience. In some embodiments, one or more decryption keys can be stored for use in a web browser in HTML5 offline storage.

In some embodiments, an identifier of one or more decryption keys necessary to decrypt the encrypted content can be included. This can take the form of a keyhash which identifies the key to be used. Such a keyhash or other identifier can be included in the <encrypted>tag, such as <encrypted keyhash="f077b4"> which indicates the key to use is the "f077b4" key. In some embodiments, the keyhash or identifier can be included in the unencrypted content of the webpage or be otherwise located. In some embodiments, the developer device can include a checksum value which can be used to determine the success or failure of decryption of the encrypted content. This checksum can be included in the <encrypted> tag, such as <encrypted checksum="72793f"> inside the encrypted content (for example, the first few digits of the encrypted content), or be otherwise located. When a user or web browser attempts to decrypt the identified content, the user or web browser can check whether decryption has yielded a checksum value which matches the expected checksum in order to determine whether decryption was successful or not.

At 110, the developer device provides one or more decryption keys to one or more authorized users. The developer device can provide these decryption keys through various means, so long as the authorized user or users receive them such that they can access the encrypted content.

At 112, in response to user input, the developer device provides the webpage to a server to host the webpage. By providing the webpage to the server, the developer device makes the webpage generally available to the public, including those with the decryption keys and those without. The server hosting the webpage can host a single version of a static webpage, without need to dynamically produce versions of the page for different users based on any identifying information. In some embodiments, in response to user input, the developer device may provide a partially finished version of the webpage to a server, which may perform some of the steps of method 100. For example, a developer device may not have the means to perform the encryption of the identified content and a server (or an intermediary) may offer a service where identified content can be encrypted and/or decryption keys may be sent to the developer device for distribution or to identified users on the developer's behalf. For example, if a server or an intermediary utilizes a php function called "dom_encrypt," a developer device can use HTML code which uses such function that the server or an intermediary can process. Continuing with the example above, an example of such HTML is as follows:

<h1>Access to company secrets</h1>
<p>The secret documents are stored on our repository at IP address 192.168.1.1; to get authorization to that system please contact <security@example.com>.</p>
<p>The following user accounts are currently active:</p>
<table>
<th>Username</th><th>Pas sword</th>
<td>John Smith</td><td><?php dom_encrypt("GoWarriorsGo",get_key('john') ?></td>
<td>S ally White</td><td><?php dom_encrypt("I_like_summer 1000",get_key('sally')?></td>
<td>Bill Tucson</td><td><?php dom_encrypt ("qwerty1234",get_key('william')?></td>
</table>

In this example HTML code for a webpage, instead of the encrypted unintelligible 32-character strings, the developer device has included the content to be encrypted (including "GoWarriorsGo," "I_like_summer 1000," and "qwerty1234") which will be encrypted and enclosed within <encrypted> tags by using the php dom_encrypt function. In some embodiments, in response to user input, a developer device can create or use a function such as php dom_encrypt without relying on a server or other intermediary. After the webpage has been provided to the server at 112, method 100 ends at 114.

Figure 2:
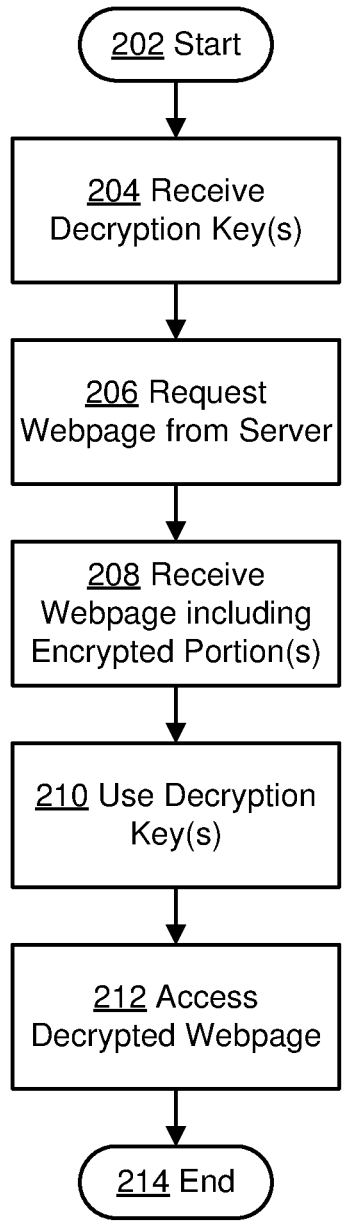
FIG. 2 depicts an example method for accessing encrypted content in a static webpage which includes encrypted content, in accordance with embodiments of the present disclosure.

Referring now to FIG. 2, depicted is an example method 200 for accessing encrypted content in a static webpage which includes encrypted content, in accordance with embodiments of the present disclosure. Method 200 can include more or less actions than those depicted. Method 200 can include actions in different orders than those depicted. Method 200 can be performed using a user device (such as user device 500 depicted in FIG. 5).

From start 202, a user device receives one or more decryption keys at 204. A user device can receive the one or more decryption keys from a developer device used to create a webpage with encrypted content, such as the developer device performing method 100. A user device can also receive one or more decryption keys from other sources, including a server (which may host a webpage with encrypted content the decryption keys correspond to), a service provider (which may have assisted in creation of a webpage with encrypted content the decryption keys correspond to), or any other relevant source.

At 206, the user device requests a webpage from a server. The user device can request a webpage from a server through various conventional means including using an internet browser. The internet browser may be a generic internet browser or may have functionality related to accessing webpages with encrypted content, including recognition of tags such as <encrypted> and </encrypted>, decryption of encrypted content with corresponding keys, storage of decryption keys, or any other relevant functionality. The internet browser can include this functionality within the browser itself or can access such functionality through one or more of a browser plugin, JavaScript code, or other means. References herein to an internet browser performing an action or having such functionality include the internet browser itself, any plugins, any JavaScript code, or any other means.

At 208, the user device receives the webpage which includes one or more encrypted portions. The user device may access this webpage using an internet browser, including that discussed regarding operation 206. In some embodiments, the user device may view the webpage as it is initially received, with the encrypted portions remaining encrypted until decryption occurs. In other embodiments, the user device or the user device's internet browser may perform one or more actions regarding the encrypted content before the webpage is displayed to the user. In embodiments where a user device uses an internet browser, the user device's internet browser may prompt a user for a decryption key to use in decrypting content on the webpage. The internet browser may hide encrypted content to avoid showing a user unintelligible strings of characters or content which is otherwise not useful to the user. The internet browser may indicate through various means or using various messages that the webpage contains encrypted content and may mark or indicate where the encrypted content would appear on the webpage. The internet browser may automatically decrypt the encrypted content in operation 210 before displaying the webpage to the user.

At 210, the user device utilizes the one or more decryption keys to decrypt the encrypted portion(s) of the webpage. The user device may receive, through manual user input via an input device, the one or more decryption keys to access the encrypted portion(s) of the webpage, which may occur upon prompt by an internet browser or a plugin or other feature associated with an internet browser. A user device's internet browser may also have stored decryption keys which can be used when encrypted content is detected. Such an internet browser can determine if any of the stored decryption keys correspond to the encrypted portion(s) of the webpage, which can entail comparing a keyhash or other identifier of the decryption key and an indication in the encrypted tag or encrypted content that a specific key corresponds to the encryption used. In some embodiments, an internet browser can attempt to use one or more decryption keys to decrypt the encrypted portion(s) and check whether the decryption was successful by comparing to a checksum value which may be stored in the encrypted tag or encrypted content.

At 212, the user device accesses the decrypted webpage. After the user device has used the decryption keys at operation 210, the webpage can be accessed by the user device (or in embodiments where the user device displayed a version of the webpage upon receipt at 208, the webpage can be refreshed or updated). During this operation, the user can view the results of the decryption of the previously encrypted content on the user device. In some embodiments, the decrypted webpage may be partially decrypted, which may occur if the user has used less than all of the possible decryption keys for the webpage. Any remaining encrypted content can be hidden from the user's view, displayed without modification (including as a string of unintelligible characters), or with an indication that encrypted content is present, such as a message indicating "encrypted data," "inaccessible private data," or other such indication that they are unable to view content.

Continuing with the examples discussed in regard to FIG. 1, if Sally's user device (or anyone else's user device with a decryption key to decrypt the encrypted information in the Sally row of the table) uses the appropriate decryption key, the HTML code for the example webpage could be as follows:

<h1>Access to company secrets</h1>
<p>The secret documents are stored on our repository at IP address 192.168.1.1; to get authorization to that system please contact <security@example.com>.</p>
<p>The following user accounts are currently active:</p>
<table>
<th>Username</th><th>Pas sword</th>
<td>John Smith</td><td><encrypted>9018ac3418ead96d405e8c2e842f3d7b</encrypted></td>
<td>S ally White</td><td><decrypted>I_like_summer 1000</decrypted></td>
<td>Bill Tucson</td><td><encrypted>c494277674a843de7827cc4adb5c8b3b</encrypted></td>
</table>

In this example, the entry in the table for Sally White's password now shows the decrypted content "I_like_summer 1000," but the content for the remaining users remains encrypted. This could occur if the decryption key for the Sally White entry is used, but decryption keys for the John Smith and Bill Tucson content were not used or did not successfully decrypt the information. The web server which hosted the webpage can identify that someone accessed this webpage, but because the user did not need to send a username and password or use another login feature, the server does not know if the user was Sally White, or whether the user was able to decrypt any portions of the webpage. After accessing the decrypted webpage at 212, method 200 ends at 214.

Figure 3:
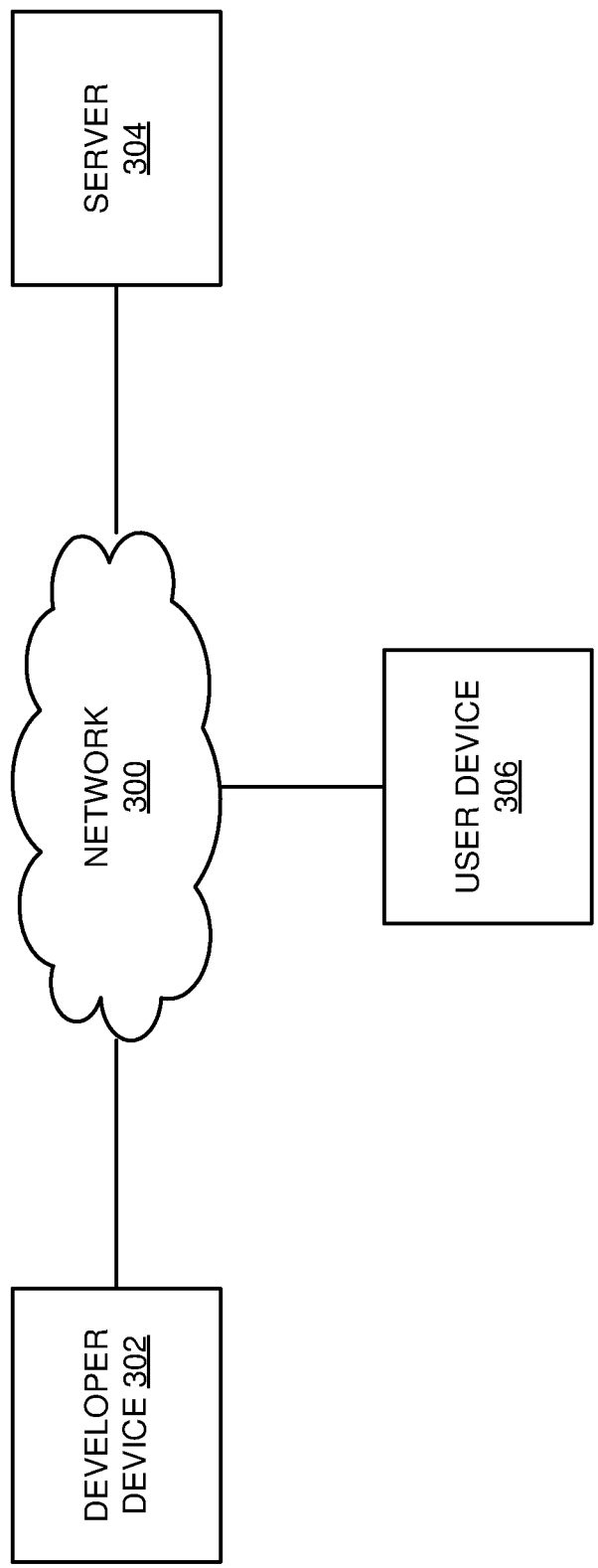
FIG. 3 illustrates a block diagram of a network in which some embodiments of the present disclosure can be implemented.

FIG. 3 illustrates a block diagram of network 300 in which some embodiments of the present disclosure can be implemented. Network 300 communicatively couples developer device 302, server 304, and user device 306 via a physical or wireless connection. Network 300 can be as large as the internet or can be a smaller network such as a wide area network (WAN), metropolitan area network (MAN), an intranet for a company or other organization, or any other form of network. In some embodiments, developer device 302 is consistent with developer device 400 of FIG. 4. In some embodiments, user device 306 is consistent with user device 500 of FIG. 5.

A developer can use developer device 302 in construction of a webpage and performing method 100 for secure transmission of a static webpage including encrypted content. The developer device can send this webpage to server 304 for hosting and/or for completion of the webpage in accordance with method 100. A user can use user device 306 to access a webpage and in performing method 200 for accessing encrypted content in a static webpage which includes encrypted content, including requesting a webpage from server 304. Server 304 may be a single server or may represent a series of servers or devices through which communications requests flow between a developer or user and the ultimate destination server. Multiple servers 304 can exist which may host one or more cached versions of webpages used in methods 100 and 200.

Figure 4:
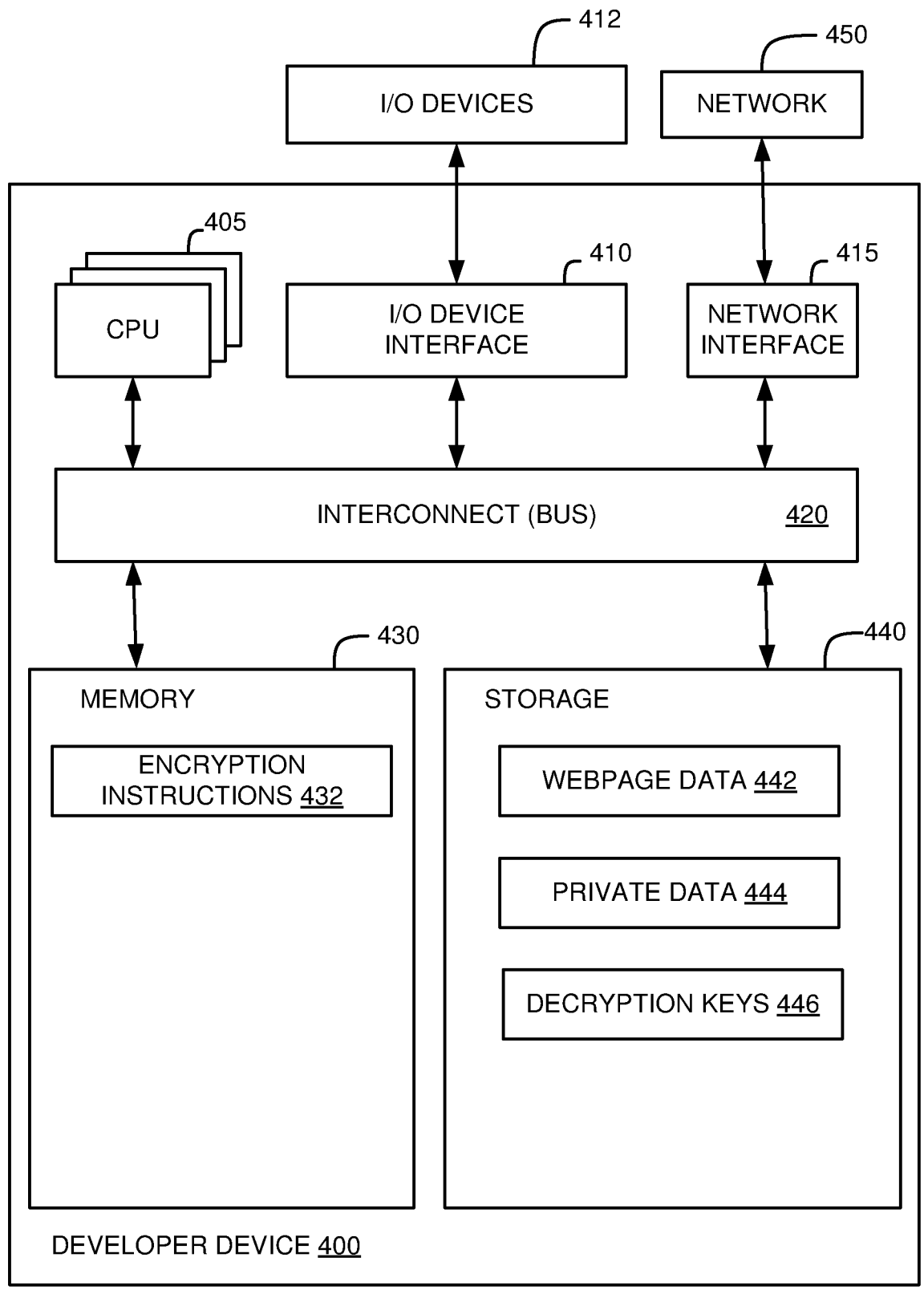
FIG. 4 illustrates a block diagram of a developer device, in accordance with some embodiments of the present disclosure.

Referring now to FIG. 4, illustrated is a block diagram of a developer device 400, in accordance with some embodiments of the present disclosure. In some embodiments, developer device 400 performs operations in accordance with FIG. 1 and/or can be used by a developer to perform operations in accordance with FIG. 1 as described above. The developer device 400 can include one or more processors 405 (also referred to herein as CPUs 405), an I/O device interface 410 which can be coupled to one or more I/O devices 412, a network interface 415, an interconnect (e.g., BUS) 420, a memory 430, and a storage 440.

In some embodiments, each CPU 405 can retrieve and execute programming instructions stored in the memory 430 or storage 440. The interconnect 420 can be used to move data, such as programming instructions, between the CPUs 405, I/O device interface 410, network interface 415, memory 430, and storage 440. The interconnect 420 can be implemented using one or more busses. Memory 430 is generally included to be representative of a random access memory (e.g., static random access memory (SRAM), dynamic random access memory (DRAM), or Flash).

In some embodiments, the memory 430 can be in the form of modules (e.g., dual in-line memory modules). The storage 440 is generally included to be representative of a non-volatile memory, such as a hard disk drive, solid state device (SSD), removable memory cards, optical storage, or flash memory devices. In an alternative embodiment, the storage 440 can be replaced by storage area-network (SAN) devices, the cloud, or other devices connected to the developer device 400 via the I/O devices 412 or a network 450 via the network interface 415.

The CPUs 405 can be a single CPU, multiple CPUs, a single CPU having multiple processing cores, or multiple CPUs with one or more of them having multiple processing cores in various embodiments. In some embodiments, a processor 405 can be a digital signal processor (DSP). The CPUs 405 can additionally include one or more memory buffers or caches (not depicted) that provide temporary storage of instructions and data for the CPUs 405. The CPUs 405 can be comprised of one or more circuits configured to perform one or more methods consistent with embodiments of the present disclosure.

The memory 430 of developer device 400 includes encryption instructions 432. Encryption instructions 432 can be processor-executable instructions for encrypting content to be included in a generally accessible, static webpage. Encryption instructions 432 can take various forms in various embodiments, including a program or function to automatically encrypt and tag encrypted content when executed by CPU 405, such as the php dom_encrypt function discussed above regarding FIG. 1. In other embodiments, encryption instructions can be instructions that execute an encryption algorithm such as, but not limited to, Data Encryption Standard (DES), triple DES, Rivest-Shamir-Adleman, Blowfish, Twofish, and Advanced Encryption Standard (AES). In some embodiments, encryption instructions 432 can create keyhash(es) or checksum value(s) and/or include keyhash(es) or checksum value(s)within or accompanying encrypted content. Encryption instructions 432 can also create decryption keys (including decryption keys 446) for use in decrypting information encrypted using encryption instructions 432.

Storage 440 contains webpage data 442, private data 444, and decryption keys 446. Webpage data 442 can be data used by a developer using developer device 400 in the construction of a webpage and can include various forms of information without limitation.

Private data 444 is the data to be included in a webpage being developed by the developer using developer device 400, which is to be encrypted. Private data 444 can include personally identifiable information, private addresses and phone numbers, banking information, student test scores, employment data, health records, private photographs or videos, or any other information which the developer determines should not be made public. Private data 444 can be present in storage 440 in an unencrypted form (such as before the developer device executes encryption instructions 432), in an encrypted form (such as after the developer device executes encryption instructions 432), or both.

Decryption keys 446 can be those created using encryption instructions 432 for use in decrypting information encrypted using encryption instructions 432. Decryption keys 446 can be transmitted or otherwise provided to appropriate user devices to allow them to access the encrypted content, such as private data 444, when they access the webpage.

In some embodiments as discussed above, the memory 430 stores encryption instructions 432, and the storage 440 stores webpage data 442, private data 444, and decryption keys 446. However, in various embodiments, each of the encryption instructions 432, webpage data 442, private data 444, and decryption keys 446 are stored partially in memory 430 and partially in storage 440, or they are stored entirely in memory 430 or entirely in storage 440, or they are accessed over a network 450 via the network interface 415.

In various embodiments, the I/O devices 412 can include an interface capable of presenting information and receiving input. For example, I/O devices 412 can receive input from a developer and present information to a developer and/or a device interacting with developer device 400.

In some embodiments, the network 450 is consistent with network 300 as described with respect to FIG. 3. The network 450 can connect (via a physical or wireless connection) the developer device 400 with other networks, and/or one or more devices (e.g., server 304 of FIG. 3) that interact with the developer device.

Logic modules throughout the developer device 400—including but not limited to the memory 430, the CPUs 405, and the I/O device interface 410—can communicate failures and changes to one or more components to a hypervisor or operating system (not depicted). The hypervisor or the operating system can allocate the various resources available in the developer device 400 and track the location of data in memory 430 and of processes assigned to various CPUs 405. In embodiments that combine or rearrange elements, aspects and capabilities of the logic modules can be combined or redistributed. These variations would be apparent to one skilled in the art.

Figure 5:
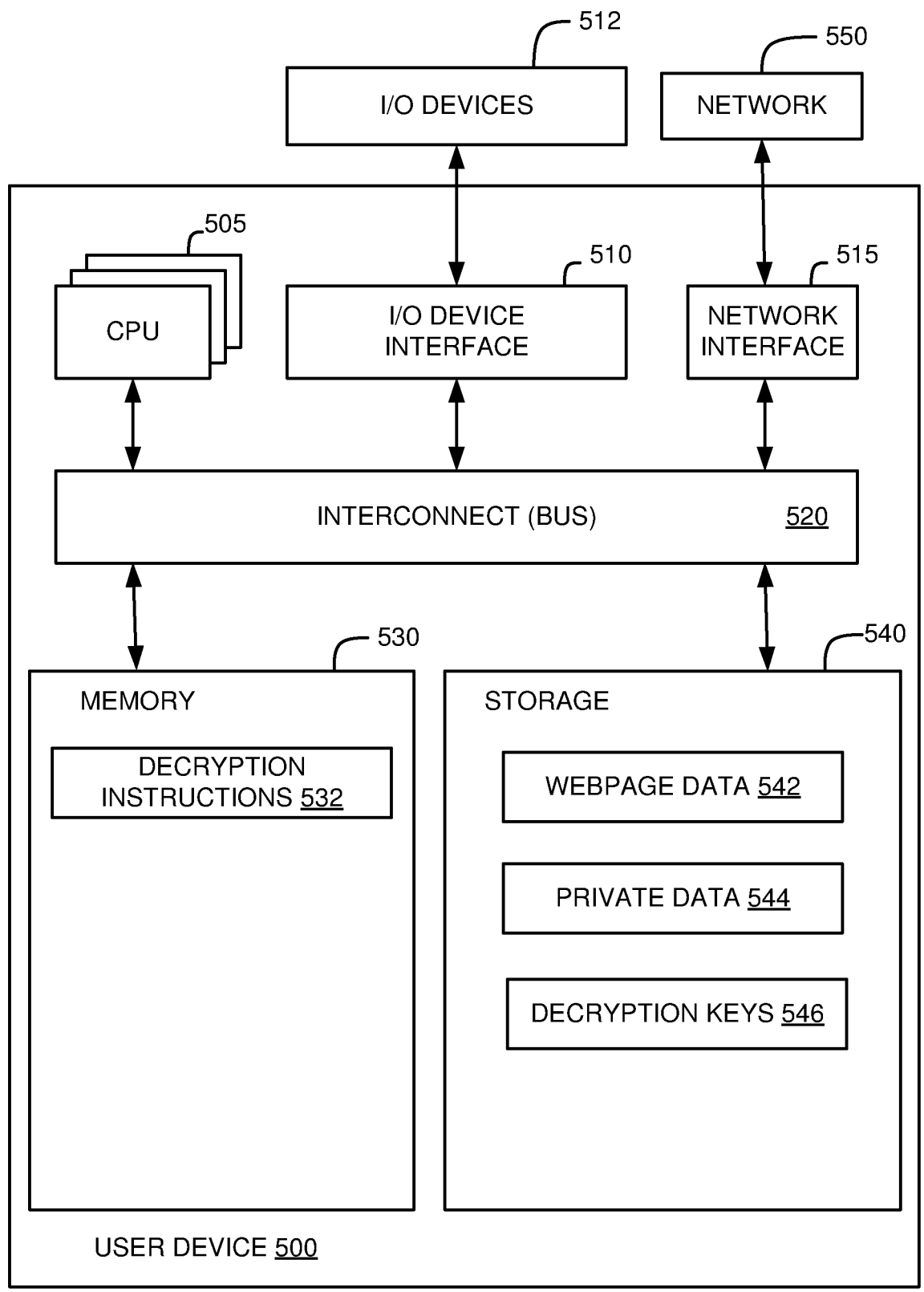
FIG. 5 illustrates a block diagram of a user device, in accordance with some embodiments of the present disclosure.

Referring now to FIG. 5, illustrated is a block diagram of a user device 500, in accordance with some embodiments of the present disclosure. In some embodiments, user device 500 performs operations in accordance with FIG. 2 and/or can be used by a user to perform operations in accordance with FIG. 2 as described above. The user device 500 can include one or more processors 505 (also referred to herein as CPUs 505), an I/O device interface 510 which can be coupled to one or more I/O devices 512, a network interface 515, an interconnect (e.g., BUS) 520, a memory 530, and a storage 540.

In some embodiments, each CPU 505 can retrieve and execute programming instructions stored in the memory 530 or storage 540. The interconnect 520 can be used to move data, such as programming instructions, between the CPUs 505, I/O device interface 510, network interface 515, memory 530, and storage 540. The interconnect 520 can be implemented using one or more busses. Memory 530 is generally included to be representative of a random access memory (e.g., static random access memory (SRAM), dynamic random access memory (DRAM), or Flash).

In some embodiments, the memory 530 can be in the form of modules (e.g., dual in-line memory modules). The storage 540 is generally included to be representative of a non-volatile memory, such as a hard disk drive, solid state device (SSD), removable memory cards, optical storage, or flash memory devices. In an alternative embodiment, the storage 540 can be replaced by storage area-network (SAN) devices, the cloud, or other devices connected to the user device 500 via the I/O devices 512 or a network 550 via the network interface 515.

The CPUs 505 can be a single CPU, multiple CPUs, a single CPU having multiple processing cores, or multiple CPUs with one or more of them having multiple processing cores in various embodiments. In some embodiments, a processor 505 can be a digital signal processor (DSP). The CPUs 505 can additionally include one or more memory buffers or caches (not depicted) that provide temporary storage of instructions and data for the CPUs 505. The CPUs 505 can be comprised of one or more circuits configured to perform one or more methods consistent with embodiments of the present disclosure.

The memory 530 of user device 500 includes decryption instructions 532. Decryption instructions 532 can be processor-executable instructions for decrypting encrypted content included in a generally accessible, static webpage. Decryption instructions 532 can utilize decryption keys 546 in performing decryption. Decryption instructions 532 can take various forms in various embodiments, including a program or function to automatically decrypt encrypted content when run. This can be performed by a web browser, a plugin associated with a web browser, or by any similar means. In some embodiments, decryption instructions can be instructions that remove an encryption created with an algorithm such as, but not limited to, Data Encryption Standard (DES), triple DES, Rivest-Shamir-Adleman, Blowfish, Twofish, and Advanced Encryption Standard (AES). In some embodiments, decryption instructions 532 can verify keyhash(es) associated with a decryption key used in the decryption compared to a keyhash within or accompanying encrypted content. Decryption instructions 532 can also verify that decryption performed was successful by comparing a checksum result with a checksum value within or accompanying encrypted content.

Storage 540 contains webpage data 542, private data 544, and decryption keys 546. Webpage data 542 can be data accessed by a user using user device 500 when requesting and receiving a webpage, including from a webpage hosting server and can include various forms of information without limitation.

Private data 544 is the data to be encrypted in a webpage accessed by a user using user device 500. Private data 544 can include personally identifiable information, private addresses and phone numbers, banking information, student test scores, employment data, health records, private photographs or videos, or any other information which the developer determines should not be made public. Private data 544 can be present in storage 540 in an encrypted form (such as before the user device executes decryption instructions 532), in an unencrypted form (such as after the user device executes decryption instructions 532), or both.

Decryption keys 546 can be those received from a developer device or from an intermediate device for use in decrypting information contained within a publicly accessible, static webpage, such as that constructed using method 100 of FIG. 1.

In some embodiments as discussed above, the memory 530 stores decryption instructions 532, and the storage 540 stores webpage data 542, private data 544, and decryption keys 546. However, in various embodiments, each of the decryption instructions 532, webpage data 542, private data 544, and decryption keys 546 are stored partially in memory 530 and partially in storage 540, or they are stored entirely in memory 530 or entirely in storage 540, or they are accessed over a network 550 via the network interface 515.

In various embodiments, the I/O devices 512 can include an interface capable of presenting information and receiving input. For example, I/O devices 512 can receive input from a user and present information to a user and/or a device interacting with user device 500. For example, in some embodiments, one or more I/O devices 512 can be used by the user device 500 to prompt a user for manual entry of a decryption key, as discussed above.

In some embodiments, the network 550 is consistent with network 300 as described with respect to FIG. 3. The network 550 can connect (via a physical or wireless connection) the user device 500 with other networks, and/or one or more devices (e.g., server 304 of FIG. 3) that interact with the user device.

Logic modules throughout the user device 500—including but not limited to the memory 530, the CPUs 505, and the I/O device interface 510—can communicate failures and changes to one or more components to a hypervisor or operating system (not depicted). The hypervisor or the operating system can allocate the various resources available in the user device 500 and track the location of data in memory 530 and of processes assigned to various CPUs 505. In embodiments that combine or rearrange elements, aspects and capabilities of the logic modules can be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for secure transmission of a static webpage including encrypted content, the method comprising:
identifying a first portion and a second portion of content of a static webpage to encrypt, the first portion and the second portion being less than the entire static webpage;
encrypting the first and second portions of content of the static webpage;
providing an identifier, with the first portion of content, which indicates an identity of the first decryption key which can be used to decrypt the first portion of content;
providing a first decryption key to a first group of user devices and a second decryption key to a second group of user devices, wherein the first decryption key allows each user device in the first group of user devices to decrypt the first encrypted portion of content of the static webpage and the second decryption key allows each user device in the second group of user devices to decrypt the second encrypted portion of content of the static webpage; and
providing the static webpage to a server, wherein the server allows public access to the static webpage.

2. The method of claim 1, the method further comprising:
enclosing the first portion of content within Hypertext Markup Language tags which indicate the first portion of content is encrypted.

3. The method of claim 1, the method further comprising:
providing a checksum value, with the first portion of content, which can be used by a user device in the first group of user devices to verify successful decryption of the first portion of content.

4. The method of claim 1, wherein the first decryption key provided to a first group of user devices can be stored in a web browser used by each user device in the first group of user devices.

5. The method of claim 1, wherein the encrypting of the first portion of content is performed using an algorithm selected from the group consisting of Data Encryption Standard (DES), triple DES, Rivest-Shamir-Adleman, Blowfish, Twofish, and Advanced Encryption Standard (AES).

6. A system for secure transmission of a static webpage including encrypted content, the system comprising:
one or more processors; and
a memory communicatively coupled to the one or more processors, wherein the memory comprises instructions which, when executed by the one or more processors, cause the one or more processors to perform a method comprising:
identifying a first portion of content of the static webpage to encrypt, the first portion being less than the entire static webpage;
encrypting the first portion of content of the static webpage;
enclosing the first portion of content within Hypertext Markup Language tags which indicate the first portion of content is encrypted;
providing an identifier, with the first portion of content, which indicates an identity of the first decryption key which can be used to decrypt the first portion of content;
providing a first decryption key to a first group of user devices, wherein the first decryption key allows each user device in the first group of user devices to decrypt the first encrypted portion of content of the static webpage; and
providing the static webpage to a server, wherein the server allows public access to the static webpage.

7. The system of claim 6, the method further comprising:
providing a checksum value, with the first portion of content, which can be used by a user device in the first group of user devices to verify successful decryption of the first portion of content.

8. The system of claim 6, the method further comprising:
identifying a second portion of content of the static webpage to encrypt;
encrypting the second portion of content of the static webpage, wherein the first portion and second portion are not identical and wherein the first portion and second portion do not comprise all of the static webpage; and
providing a second decryption key to a second group of user devices, wherein the second decryption key allows each user device in the second group of user devices to decrypt the second encrypted portion of content of the static webpage.

9. The system of claim 6, wherein the first decryption key provided to a first group of user devices can be stored in a web browser used by each user device in the first group of user devices.

10. The system of claim 6, wherein the encrypting of the first portion of content is performed using an algorithm selected from the group consisting of Data Encryption Standard (DES), triple DES, Rivest-Shamir-Adleman, Blowfish, Twofish, and Advanced Encryption Standard (AES).

11. A computer program product for secure transmission of a static webpage including encrypted content, the computer program product comprising a computer readable storage medium having program instructions embodied therewith, wherein the computer readable storage medium is not a transitory signal per se, the program instructions executable by a computer to perform a method comprising:
 identifying a first portion and a second portion of content of a static webpage to encrypt, the first portion and the second portion being less than the entire static webpage;
 encrypting the first and second portions of content of the static webpage;
 providing a checksum value, with the first portion of content, which can be used by a user device in the first group of user devices to verify successful decryption of the first portion of content;
 providing a first decryption key to a first group of user devices and a second decryption key to a second group of user devices, wherein the first decryption key allows each user device in the first group of user devices to decrypt the first encrypted portion of content of the static webpage and the second decryption key allows each user device in the second group of user devices to decrypt the second encrypted portion of content of the static webpage; and
 providing the static webpage to a server, wherein the server allows public access to the static webpage.

12. The computer program product of claim 11, the method further comprising:
 enclosing the first portion of content within Hypertext Markup Language tags which indicate the first portion of content is encrypted.

13. The computer program product of claim 11, the method further comprising:
 providing an identifier, with the first portion of content, which indicates an identity of the first decryption key which can be used to decrypt the first portion of content.

14. The computer program product of claim 11, wherein the first decryption key provided to a first group of user devices can be stored in a web browser used by each user device in the first group of user devices.

* * * * *